United States Patent
Lee

(10) Patent No.: US 7,281,810 B2
(45) Date of Patent: Oct. 16, 2007

(54) OPTICAL DEVICE AND METHODS OF MANUFACTURE

(75) Inventor: Robert Arthur Lee, East Burwood (AU)

(73) Assignee: The Commonwealth of Australia Commonwealth Scientific and Industrial Research Organisation, East Burwood, Victoria (AU)

( * ) Notice: Subject to any disclaimer, the term of this patent is extended or adjusted under 35 U.S.C. 154(b) by 5 days.

(21) Appl. No.: 10/701,975

(22) Filed: Nov. 5, 2003

(65) Prior Publication Data

US 2005/0052745 A1    Mar. 10, 2005

Related U.S. Application Data

(63) Continuation of application No. PCT/AU02/00551, filed on May 6, 2002.

(30) Foreign Application Priority Data

May 8, 2001    (AU)    .................................... PR 4833

(51) Int. Cl.
G02B 7/182    (2006.01)
(52) U.S. Cl. .................... 359/850; 359/2; 359/619; 359/883; 283/85; 430/321
(58) Field of Classification Search ............... 359/2, 359/569, 619, 850, 883; 283/85; 430/321
See application file for complete search history.

(56) References Cited

U.S. PATENT DOCUMENTS

| | | | |
|---|---|---|---|
| 4,184,700 A | * | 1/1980 | Greenaway ................. 283/91 |
| 4,568,141 A | * | 2/1986 | Antes ........................... 359/2 |
| 4,984,824 A | | 1/1991 | Antes et al. |
| 5,032,003 A | * | 7/1991 | Antes ........................ 359/567 |
| 5,428,479 A | | 6/1995 | Lee |

(Continued)

FOREIGN PATENT DOCUMENTS

EP    0 105 099    4/1984

(Continued)

OTHER PUBLICATIONS

WO 90/07133 A1 (Reserve Bank of Australia) Jun. 28, 1990.

(Continued)

*Primary Examiner*—Hung Dang
*Assistant Examiner*—Joseph Martinez
(74) *Attorney, Agent, or Firm*—Ladas & Parry LLP

(57) ABSTRACT

An optical device which generates an optically variable image, the image being optically variable in that it varies according to the position of observation, is manufactured by dividing an optically invariable image into multiple pixels. Color component values are determined for each pixel. For each of the pixels of the optically invariable image, there is determined an associated pixel surface structure which has a three-dimensional surface shape and curvature which is related via a mathematical of computer algorithm to the color component values of the associated pixel in the optically invariable image, each pixel surface structure being an individual reflective or diffractive surface structure which produces an observable optical effect. An assembly of the reflective or diffractive pixel surface structures is produced which when illuminated generates a plurality of observable optical effects which combine to form an optically variable reproduction of the optically invariable image.

26 Claims, 14 Drawing Sheets

U.S. PATENT DOCUMENTS 5,825,547 A    10/1998    Lee
6,088,161 A     7/2000    Lee

FOREIGN PATENT DOCUMENTS

| EP | 0 330 738 | 9/1989 |
| EP | 0 490 923 | 6/1992 |
| WO | WO 00/13916 | 3/2000 |
| WO | WO 02/091041 | 11/2002 |

OTHER PUBLICATIONS

WO 97/16772 A1 (Gajda et al. May 9, 1997.

WO 94/28444 A1 (Commonwealth Scientific and Industrial Research Organisation) Dec. 8, 1994.

WO 91/03747 A1 (Commonwealth Scientific and Industrial Research Organisation) Mar. 21, 1991.

WO 93/18419 A1 (Commonwealth Scientific and Industrial Research Organisation) Sep. 16, 1993.

Reimer, K., et al. "Fabrication of Microrelief Surfaces usin a One-Step Lithography Process." SPIE vol. 3226, Microelectric Structures and MEMS for Optical Processing III, Austin, Texas, 1997, pp. 1-10.

* cited by examiner

R = 0, G = 0, B = 255

R = 0, G = 255, B = 255

R = 51, G = 255, B = 0

R = 255, G = 255, B = 0

R = 255, G = 0, B = 0

R = 204, G = 0, B = 255

R = 255, G = 204, B = 0

R = 0, G = 255, B = 204

R = 204, G = 191, B = 240

3

4

5

6

R = 51, G=25, B=10

R = 51, G=51, B=51

R = 204, G=191, B=240

R = 191, G=191, B=191

$$z = \left(\frac{R}{255}\right) \sin\left(\frac{\left(x^2 + \left(\frac{G}{255}\right)y^2\right)}{2 + \left(\frac{B}{255}\right)}\right)$$

OPTICAL DEVICE AND METHODS OF MANUFACTURE

FIELD OF THE INVENTION

This invention relates to an optical device, and in particular to an optical device which, when illuminated by a light source generates one or more images which are observable from particular ranges of viewing angles around the device. The device may be used in a number of different applications, and it has particular application as an anti-forgery security device on banknotes, credit cards, cheques, share certificates and other valuable documents.

BACKGROUND ART

The new series of American Express US dollar travellers cheques, first issued in 1997, employs as an anti-counterfeiting feature a diffraction grating foil image of the American Express Centurion logo. When illuminated by a light source and the diffraction grating foil device is observed from different viewing angles the Centurion image appears to switch to an American Express box logo image. This optical variability of the device ensures that it is impossible to copy by normal photocopier or camera techniques.

Diffraction grating devices which exhibit this variable optical behaviour are referred to as optically variable devices (OVDs) and their use as an anti-counterfeiting measure to protect valuable documents is continuing to grow. Examples of particular proprietary optically variable devices and applications to date include the EXELGRAM™ device used to protect the new series of Hungarian banknotes and American Express US dollar and Euro travellers cheques and the KINEGRAM™ device used to protect the current series of German and Swiss banknotes. The EXELGRAM™ device is described in U.S. Pat. Nos. 5,825,547 and 6,088,161 while the KINEGRAM™ device is described in European patents EP 330,738 and EP 105099.

The KINEGRAM™ and EXELGRAM™ devices are examples of foil based diffractive structures that have proven to be highly effective deterrents to the counterfeiting of official documents. This class of optically diffractive anti-counterfeiting devices also includes the PIXELGRAM™ device that is described in European patent number EP 0 490 923 B1 and U.S. Pat. No. 5,428,479. PIXELGRAM™ devices are manufactured by producing a counterpart diffractive structure wherein the greyness values of each pixel of an optically invariable image are mapped to corresponding small diffractive pixel regions on the PIXELGRAM™ device. In the PIXELGRAM™ device the greyness value of a pixel corresponds to the red (R), green (G) and blue (B) colour values of the pixel in the case when all three values are made equal (i.e. R=G=B).

In spite of their industrial effectiveness these foil based diffractive optically variable devices also represent relatively expensive solutions to the counterfeiting problem when compared to the more traditional security printing technologies such as watermarking and intaglio printing. The expensive nature of these technologies is due to the requirement for embossing the diffractive microstructure into a metallized plastic foil prior to the application of this foil onto the valuable document.

Because the embossing of the OVD microstructure takes place in a specialised foil production facility external to the security printing works there is also the added problem and potential security risk if the high security foil supplies are lost or stolen in transit to the security printing plant. For these reasons security printers would prefer to have access to an OVD technology in the form of a specialised printing die that did not need to be applied as a hot stamping foil and could instead be directly printed onto the valuable document using specialised inks or lacquers in line with the normal intaglio printing process.

International patent application PCT/AU99/00741 describes one approach to the problem of developing a three dimensional microstructure that can be directly embossed or printed onto a valuable document. In this application the method of manufacture of the device involves the contact printing of a transparent electron beam lithography generated greytone mask structure into a thick optical resist layer whereby the height of the exposed resist in a particular region of the image is directly related to the optical transparency of the greytone mask in that region and each pixel region of the greytone mask is mapped to a group of microstructure elements on the exposed resist surface. In the patent application PCT/AU99/00741 the structure of the greytone mask pixels is limited to arrays of transparent square apertures or transparent track elements of variable width and length within each pixel region.

This approach is able to generate relatively deep optical image microstructures when compared to diffractive devices and is an advance over previous greytone techniques based on single pixel masks such as in the paper by Reimer et al in "Proc. SPIE Vol 3226, Microelectronic structures and MEMS for Optical Processing III, Austin, Tex., 1997". However the variability of the surface profile of the device, and therefore the consequent optical variability of any image generated by the device, is limited by the requirement of having only one pixel parameter (the greytone value) in the optically invariable image relate to the geometrical characteristics of the three dimensional microstructure. In particular this one parameter limitation means that only the height of the microstructure is able to be controlled within each small region of the microstructure.

The utility and applicability of the technology described in PCT/AU99/00741 is also further constrained by; (a) the requirement to limit the optical exposure geometry to a contact printing arrangement, (b) the requirement to limit the greytone mask pixel functions to arrays of transparent rectangular apertures or arrays of transparent track-like elements of variable width, (c) the need to have a significant number of high aspect ratio regions on the device and (d) the requirement to relate the transparency of each pixel region of the mask to the depth only of each corresponding pixel region on the device. Therefore both the geometrical surface characteristics and the method of manufacture of the device described in PCT/AU99/00741 are of limited utility in terms of industrial application.

SUMMARY OF THE INVENTION

According to an aspect of the present invention, a more general and useful approach to the design of optically reflecting or diffracting microstructures is obtained by utilising colour component values (such as the red, green and blue values) of each pixel in the optically invariable image and relating these parameters via a mathematical or computer algorithm to the parameters required to define the geometrical surface shape properties of each small surface region of the three dimensional reflective or diffractive microstructure.

Also more general approaches to the manufacture of such devices for particular applications are envisaged by: (1) considering more flexible optical arrangements that allow for the additional option of projecting only the zero order of the light beam passing through the mask onto the thick resist substrate so that spurious diffraction effects inherent in the contact printing process are removed and exposure into the optical resist is then more directly related to the transparency variation within each small region of the greytone mask, (2) broadening the class of greytone mask structures to include transparent pixellated mask structures that use curvilinear diffraction grating elements within the pixel elements of the mask to provide a wider range of control over the intensity distribution of the forward transmitted beam through each pixel region of the mask, (3) including an alternative and lower cost approach for particular specialised applications based on micro-mechanical embossing of a polycarbonate surface to generate an array of sloping mechanical indentations in the surface that mirror the required surface profile resulting from a mapping of optically invariable picture elements to sloping reflective surfaces at various angles determined by the colour properties of the optically invariable picture elements, (4) extending the greytone mask technique to include X-ray exposure of the substrate in order to obtain reflective or diffractive devices of much greater depth of relief than can be obtained by exposure via radiation of visible or ultra-violet wavelengths and; (5) fabricating the reflective or diffractive surface relief structure directly by the use of shaped electron or ion beam systems in order to obtain finer scale reflective or diffractive devices that can also be used for X-ray imaging applications. The above described surface profiling technique based on the more general colour component value mapping technique and the much broader range of reflective or diffractive surface manufacturing methods have not been disclosed to date and these represent the main objectives of the present invention.

According to a first aspect of the invention, there is provided a method of manufacturing an optical device which generates an optically variable image, the image being optically variable in that it varies according to the position of observation, the method including the steps of:

dividing an optically invariable image into multiple pixels;

determining colour component values for each pixel;

for each of the pixels of the optically invariable image, determining an associated pixel surface structure which has a three-dimensional surface shape and curvature which is related via a mathematical or computer algorithm to the colour component values of the associated pixel in the optically invariable image, each pixel surface structure being an individual reflective or diffractive surface structure which produces an observable optical effect; and producing an assembly of the reflective or diffractive pixel surface structures which when illuminated generates a plurality of observable optical effects which combine to form an optically variable reproduction of the optically invariable image.

According to a second aspect of the invention, there is provided an optical device providing an optically variable image, corresponding to an optically invariable counterpart image, the optical device including a pixellated reflective structure which is an assembly of reflective surface relief pixels and which when illuminated generates the optically variable image, the image being optically variable in that it varies according to the position of observation, wherein each of the reflective surface relief pixels is an individual reflecting surface structure, and wherein the optically variability is produced by differing angular orientations of the individual reflective surface relief pixels.

According to a third aspect of the invention, there is provided an optical device providing an optically variable image, corresponding to an optically invariable counterpart image, including a pixellated reflective or diffractive structure which is an assembly of reflective or diffractive surface relief pixels and which when illuminated generates an optically variable image, the image being optically variable in that it varies when viewed from different observation positions, wherein each of the reflective or diffractive pixels is an individual reflecting or diffracting three-dimensional surface structure which is directly related via a mathematical or computer algorithm to the colour component values of associated pixels of the optically invariable counterpart image.

According to a fourth aspect of the invention, there is provided a method of printing an optically variable image onto a document, including the steps of:

(a) creating a printing plate which has on its surface an optically variable microstructure which has a depth of 15 microns or greater;

(b) applying a layer of reflective ink to the document;

(c) applying the printing plate to the ink on the document, thereby imprinting the microstructure into the surface of the ink; and (d) applying a protective lacquer to the surface of the ink.

BRIEF DESCRIPTION OF THE DRAWINGS

The invention will now be described in more detail by reference to the drawings. It is to be understood that the particularity of the drawings does not supersede the generality of the foregoing description of the invention.

DETAILED DESCRIPTION

The present invention relates to high security Optically Variable Device (OVD) microstructures and generalised reflecting or diffracting surface structures, particularly for non foil based applications where direct printing into the application substrate or direct reflection or diffraction from the replicated surface structure of the device is a specific requirement. Unlike foil based diffractive microstructures which require the microstructure to be embossed into a hot stamping foil prior to application onto the document substrate, these new specialised microstructure geometries have a particular application related to direct printing onto the document via the use of specialised inks and lacquers. In order to avoid problems associated with the thickness variations in the paper surface (e.g. due to paper fibre variations) the microstructure of the OVD incorporates surface relief variations of relatively large depth dimension (eg 15 to 100 microns).

Specific microstructures of interest include the class of Zero Order Reflective Optic (ZORO) devices. These multiplexed micro-mirror array devices use reflection rather than diffraction as their fundamental OVD mechanism, and a typical OVD microstructure of this type may contain up to one million micro mirror surface regions of dimensions 30 microns×30 microns or less with each mirror surface region designed with predetermined angle and curvature properties according to the input picture information. In one aspect of the invention the origination of the device takes place via a multi-step process using a combination of electron beam lithography, plasma etching or wet chemical etching, photolithography and other specialised processes adopted from the semiconductor industry. Particular advantages of such ZORO devices include higher security and lower cost because all steps in the replication process take place within the security printing plant and there is no requirement for an off-line foil production facility.

Figure 1:
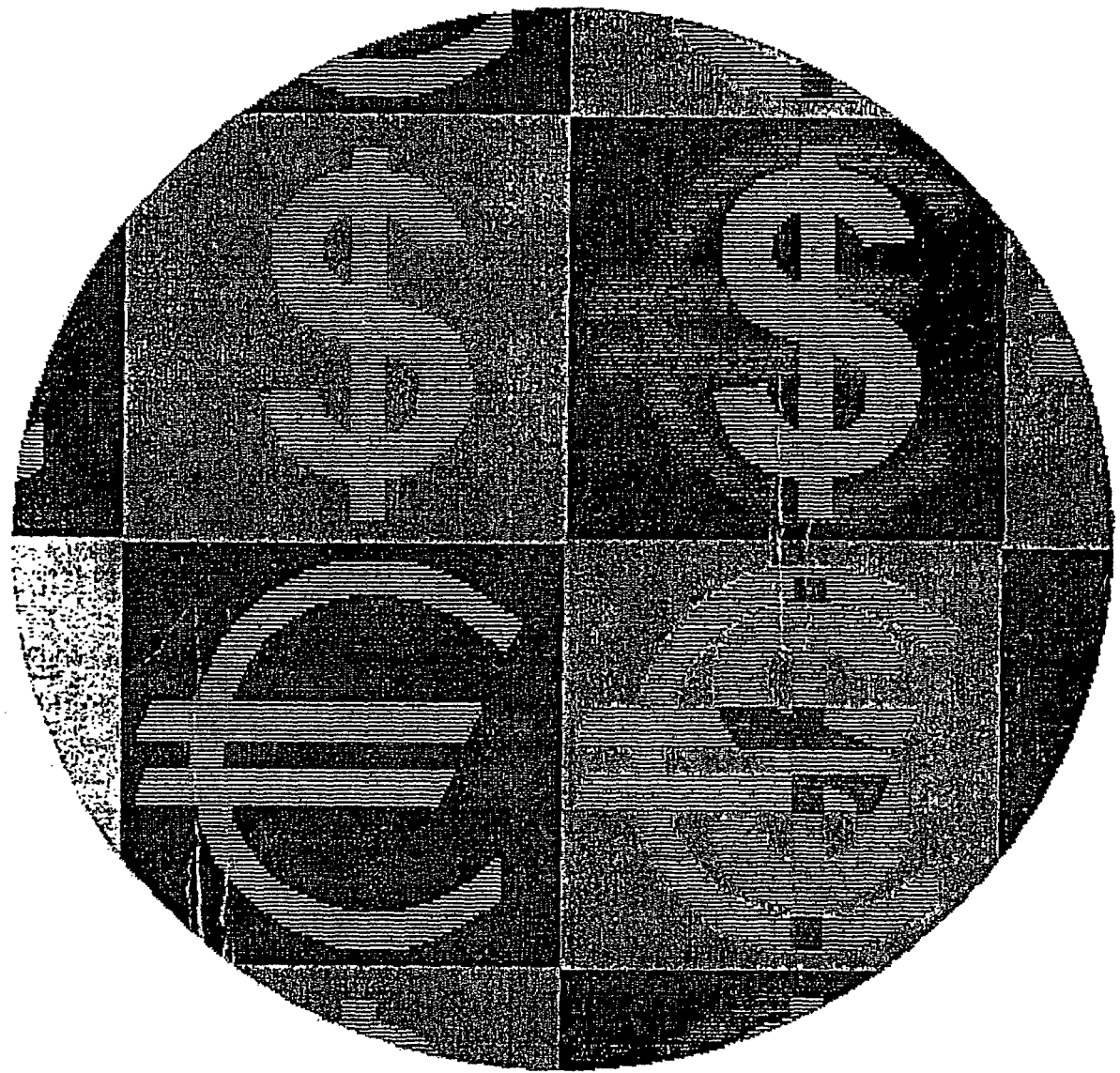
FIG. 1 illustrates an optically invariable image for use in accordance with the present invention.
Figure 1B:
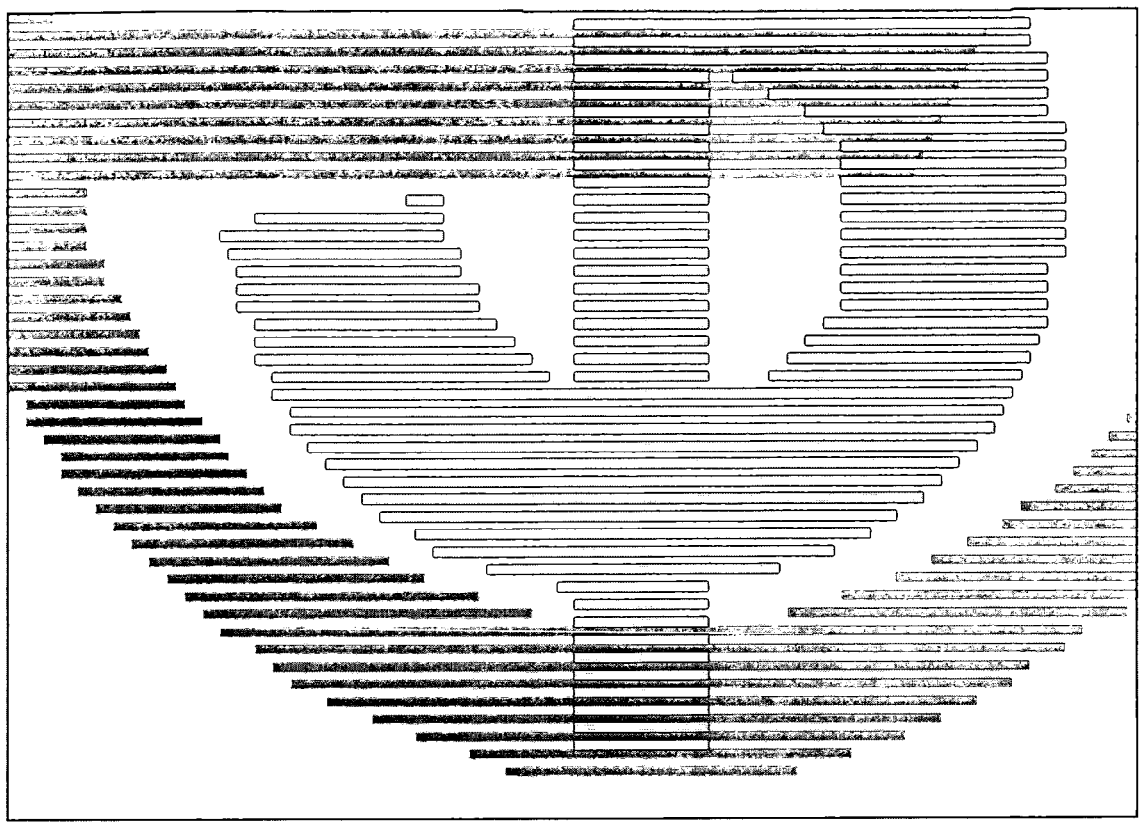
FIG. 1B shows an enlarged detail of FIG. 1.

FIG. 1 shows an example of an optically invariable image comprised of multiple picture elements or pixels defined by three colour values denoting the red (R), green (G) and blue (B) components of each pixel. In this example and the subsequent examples, RGB colour components are used, but it is to be understood that other colour components such as CMYK or HSB are equally usable. An enlarged detail of FIG. 1 is shown in FIG. 1B.

Figure 2:
FIG. 2 lists the different coloured pixels in the image of FIG. 1.
Figure 2:
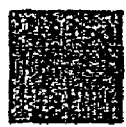
Figure 2:
Figure 2:
Figure 2:
Figure 2:
Figure 2:
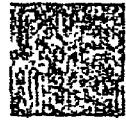
Figure 2:
Figure 2:

FIG. 2 shows the finite set of independent (R,G,B) values that have been used to construct the image of FIG. 1. This set of (R,G,B) values is referred to as the RGB palette of FIG. 1.

Figure 3:
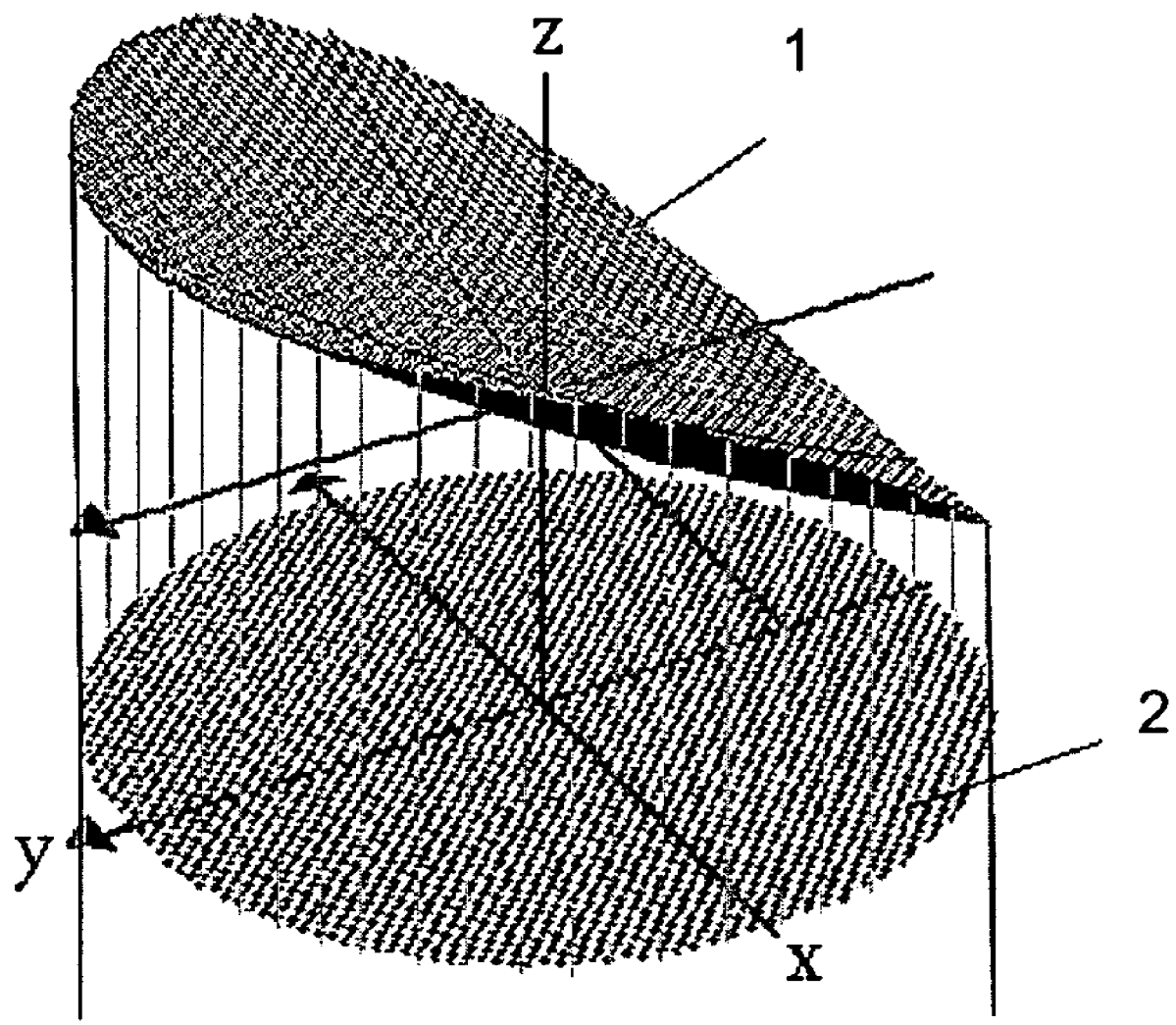
FIG. 3 illustrates an example of a micro-surface structure in accordance with an embodiment of the invention.

FIG. 3 shows an example of an associated micro-surface structure corresponding to a particular element of a set of (R,G,B) values. In this case the micro-surface structure represent a micro-reflecting mirror structure and the R, G and B values of each optically invariable pixel determine the surface slope directions and degree of curvature of each of the corresponding micro reflecting mirror structures. The micro-surface pixel in this case is 30 microns in diameter. FIG. 3 shows the micro-surface element itself 1 and the projection of the element onto the x-y plane 2. In this example, R=191, G=102 and B=51, and the equation of the reflecting surfaced element is given by:

$$Z=(R/255)Y+(G/255)(X^2+(B/255)Y^2).$$

The range of X and Y values is given by: −1.3<X<1.3; −1.3<Y<1.3.

Figure 4:
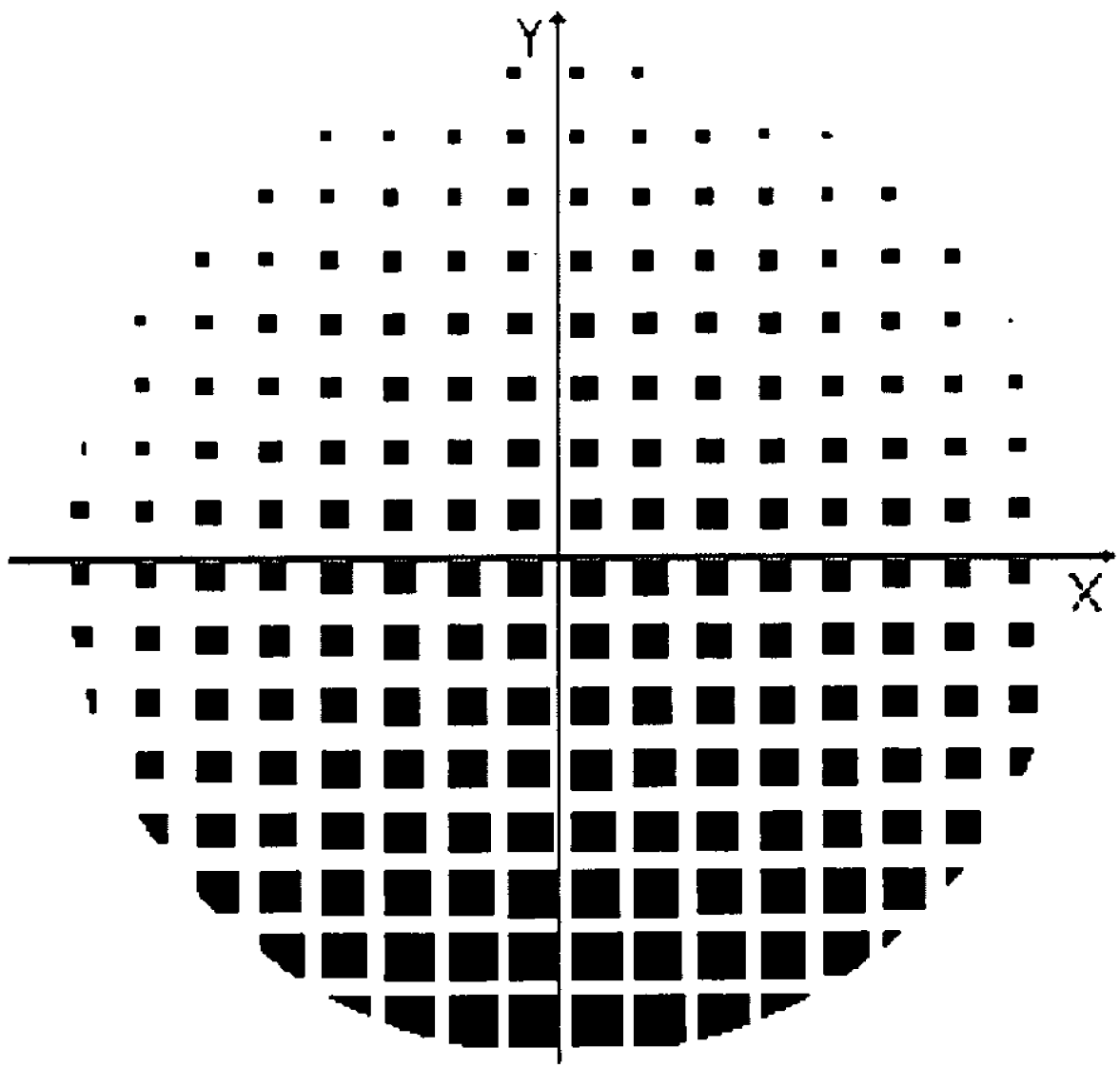
FIG. 4 illustrates a mask element for generating the structure of FIG. 3.

FIG. 4 shows an example of a colortone mask pixel element that generates the micro-surface relief structure shown in FIG. 3. In mathematical units, the maximum X and Y values in FIGS. 3 and 4 are given by Xm=1.3 and Ym=1.3. The edge length of each aperture element (shown by the black squares in FIG. 4) is:

$$D(X,Y) = 40\left[\frac{r(Ym-Y)+g(Xm^2-X^2)+gb(Ym^2-Y^2)}{rYm+g(Xm^2+bYm^2)}\right]$$

where r=R/255, g=G/255, and b=B/255.

Exel co-ordinates (Xe,Ye), which use an address grid of 1024×1024 exels to define the mask pixel area, are related to the X and Y co-ordinates by:

$$Xe=(Xm+X)(512/Xm) \text{ and } Ye=(Ym-Y)(512/Ym).$$

In this example, there are 16×16 apertures within each mask pixel element, and the pixel has dimensions of 30 microns by 30 microns. FIGS. 3 and 4 represent the micro-surface pixel palette element of the optically invariable RGB pixel palette element R=191, G=102 and B=51.

Figure 5:
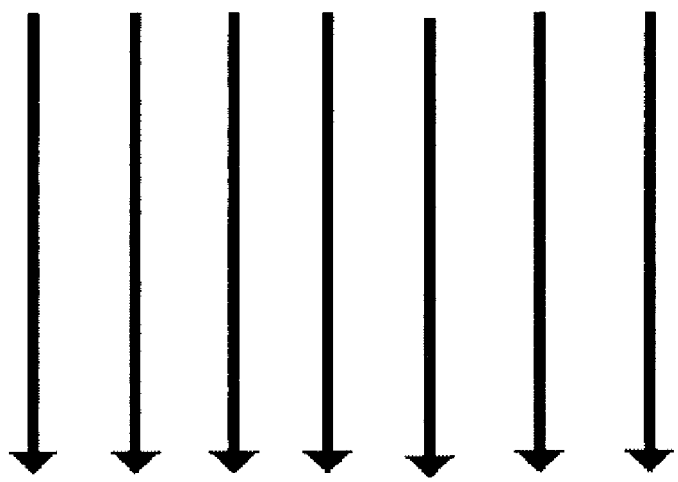
FIG. 5 illustrates an optical arrangement for manufacturing optical devices according to an embodiment of the invention.
Figure 5:
Figure 5:
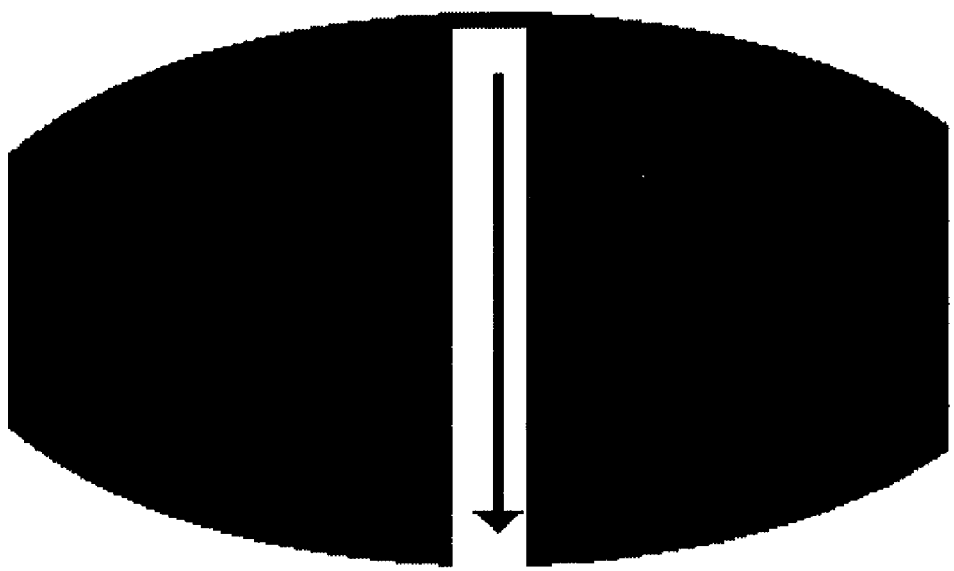
Figure 5:
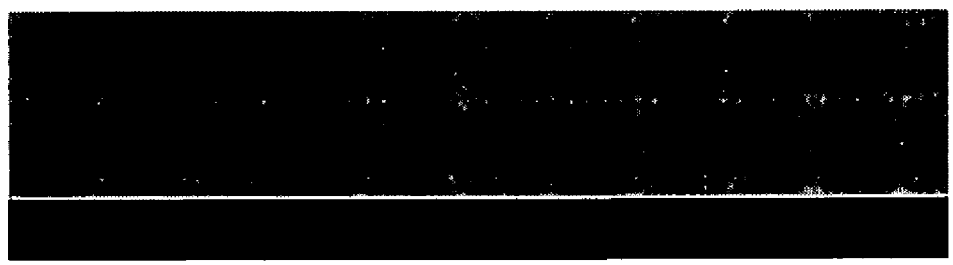

FIG. 5 shows an optical arrangement for manufacturing an optical device according to one aspect of the invention. In this optical arrangement UV light 3 is allowed to pass through a transparent mask 4 produced by electron beam lithography. After passing through the mask 4 the optical arrangement 5 ensures that the light 3 is then allowed to fall on and expose a surface comprised of photosensitive material 6 which in this case has a thickness of 30 micron.

Figure 6:
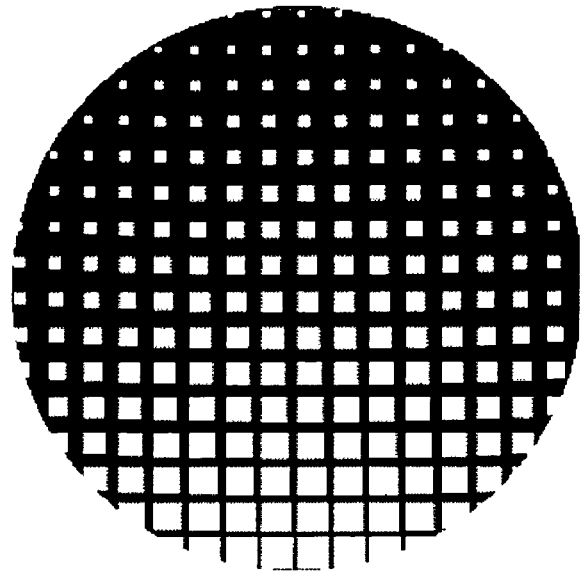
FIG. 6 illustrates different mask elements for use in accordance with an embodiment of the invention.
Figure 6:
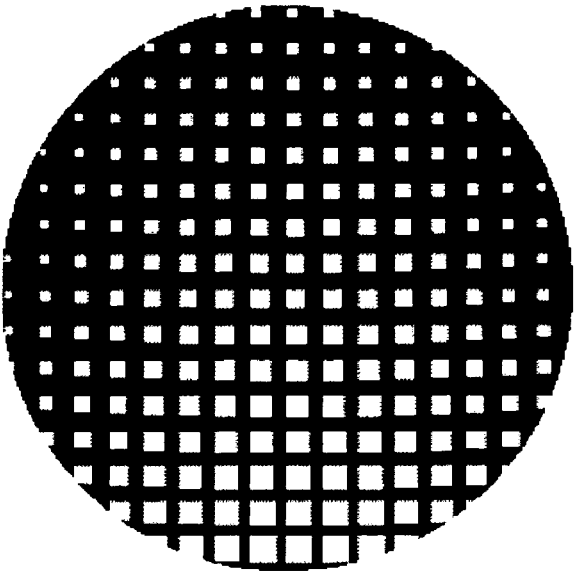
Figure 6:
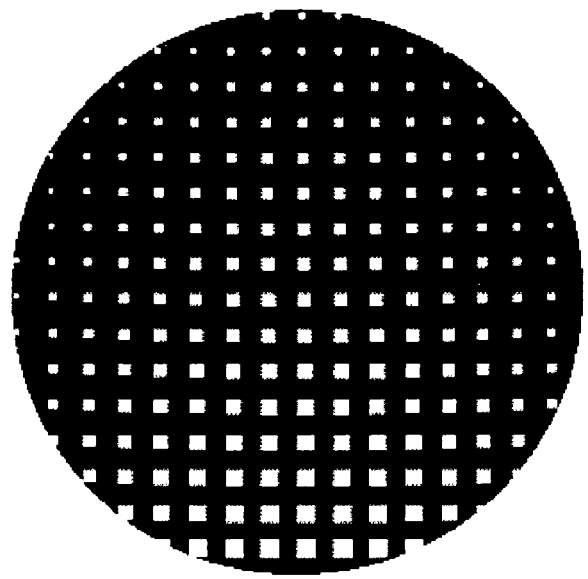
Figure 6:
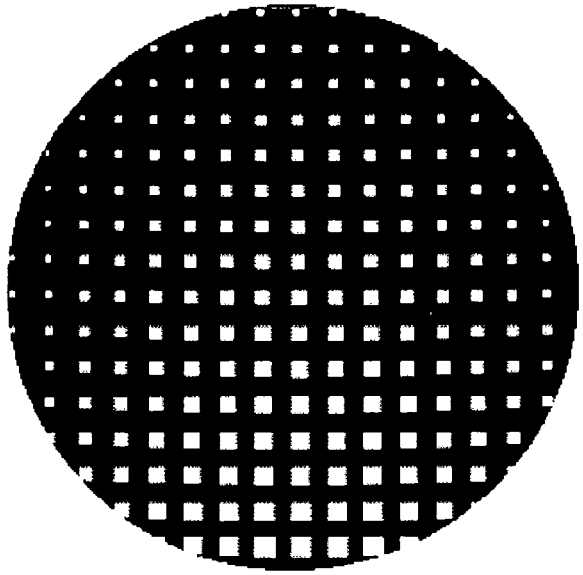

FIG. 6 shows an example of a set of transparent pixel elements that can be used as a mask palette to construct a two dimensional mask containing a multiplicity of transparent mask pixels representing the optically invariable image. When the mask is placed in front of the optical arrangement shown in FIG. 5 and light of short wavelengths is allowed to pass through the mask and allowed to expose the thick optical resist substrate (shown also in FIG. 5) via the optical arrangement then, upon development of the resist substrate a reflecting surface configuration is obtained corresponding to the required surface relief structure. The four elements in FIG. 6 use the same mathematical algorithm as FIG. 4 although the apertures are shown here in white rather than black as in FIG. 4. Different RGB values generate different light intensity distributions on the optical resist and therefore different pixel micro-surface geometries are formed after development of the optical resist, FIG. 7 shows another example of a micro-surface palette function together with computer plots showing three pixel surface elements and their corresponding RGB parameter sets.

Figure 7:
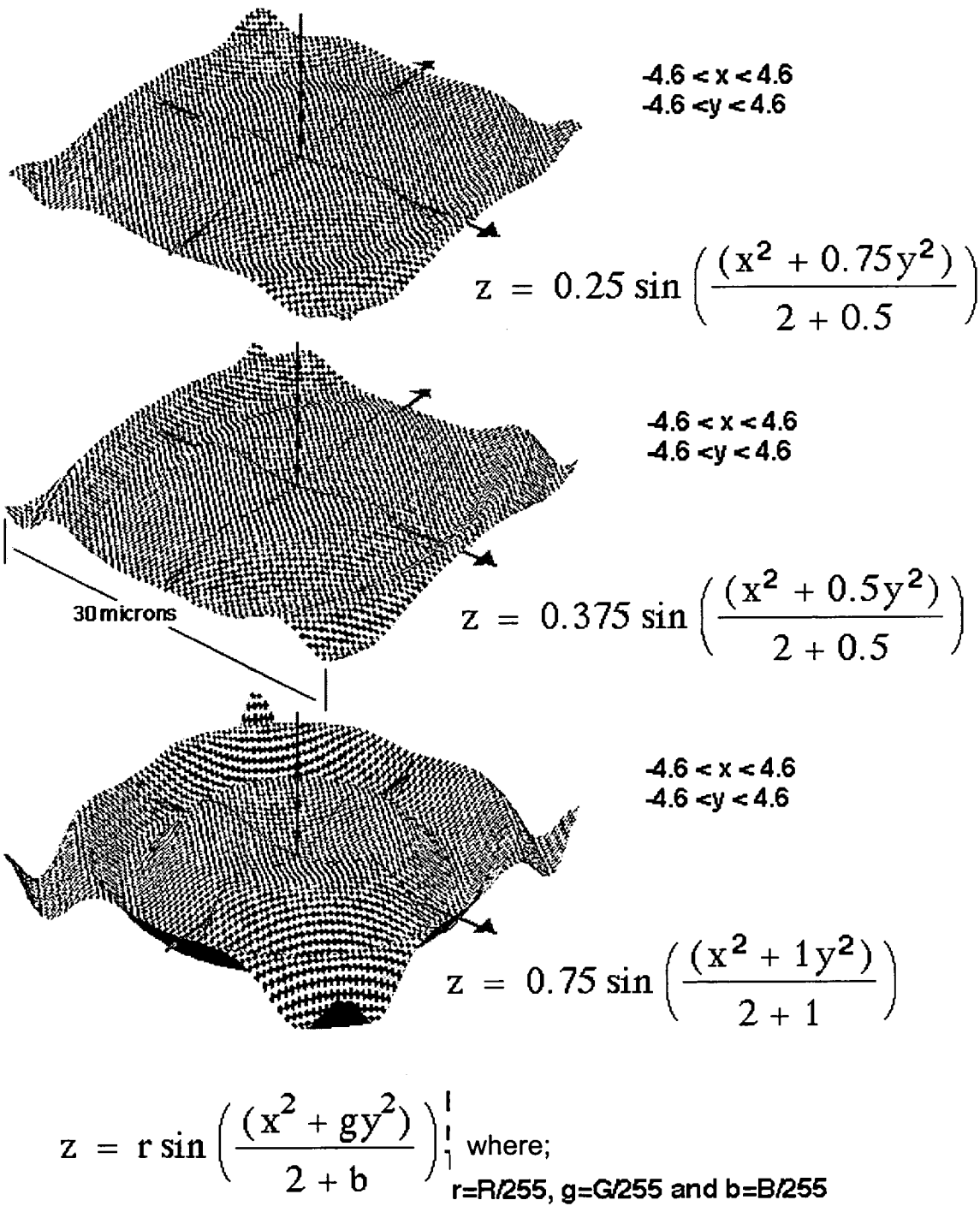
FIG. 7 shows examples of microstructure pixel elements according to an embodiment of the invention.
Figure 8:
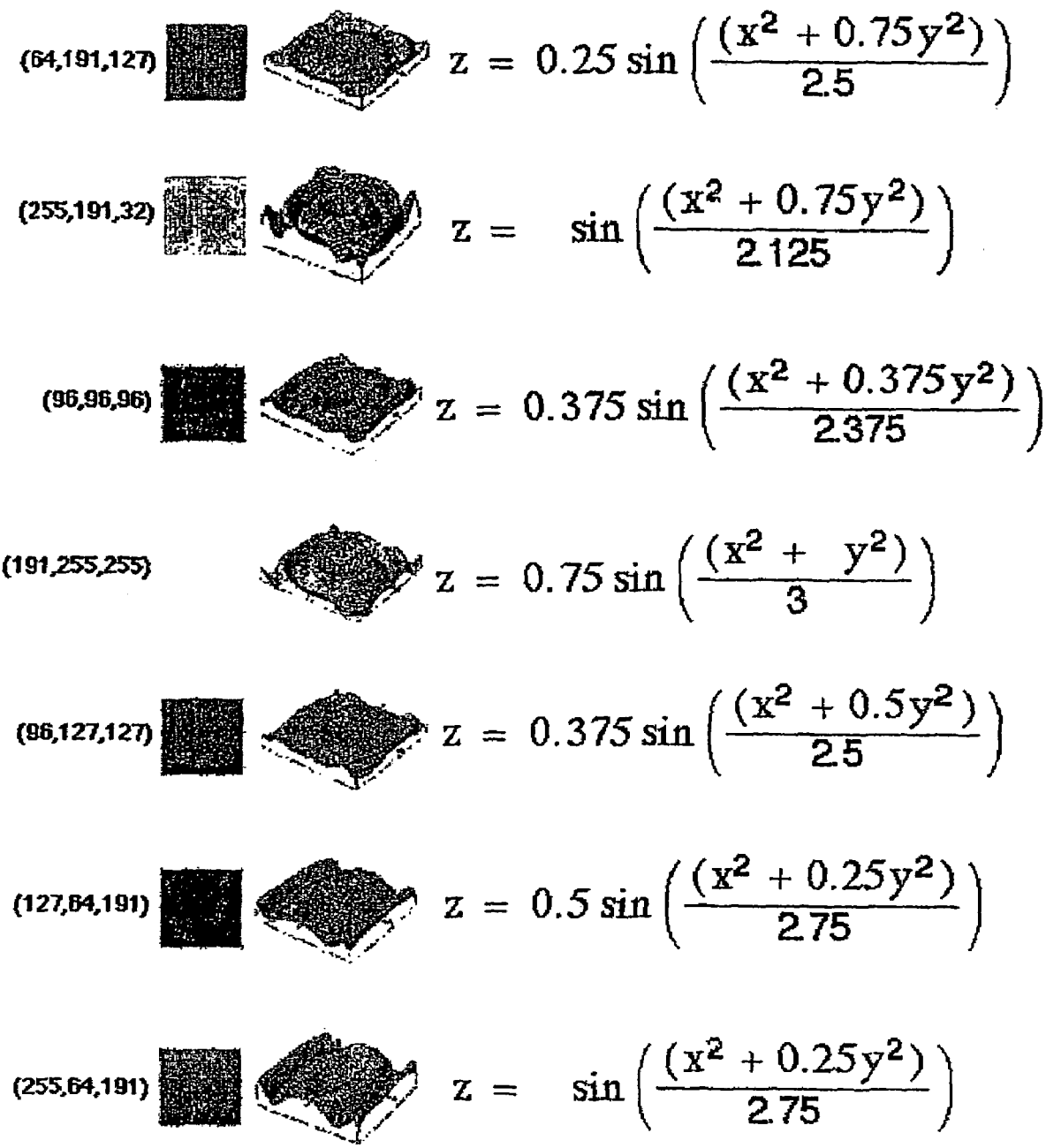
FIG. 8 shows a group of coloured optically invariable pixels matched with microstructure pixel elements according to an embodiment of the invention.

FIG. 8 shows a group of seven micro-surface palette elements belonging to the same family shown in FIG. 7. RGB values and corresponding colour patches are also shown explicitly in FIG. 8.

Figure 9:
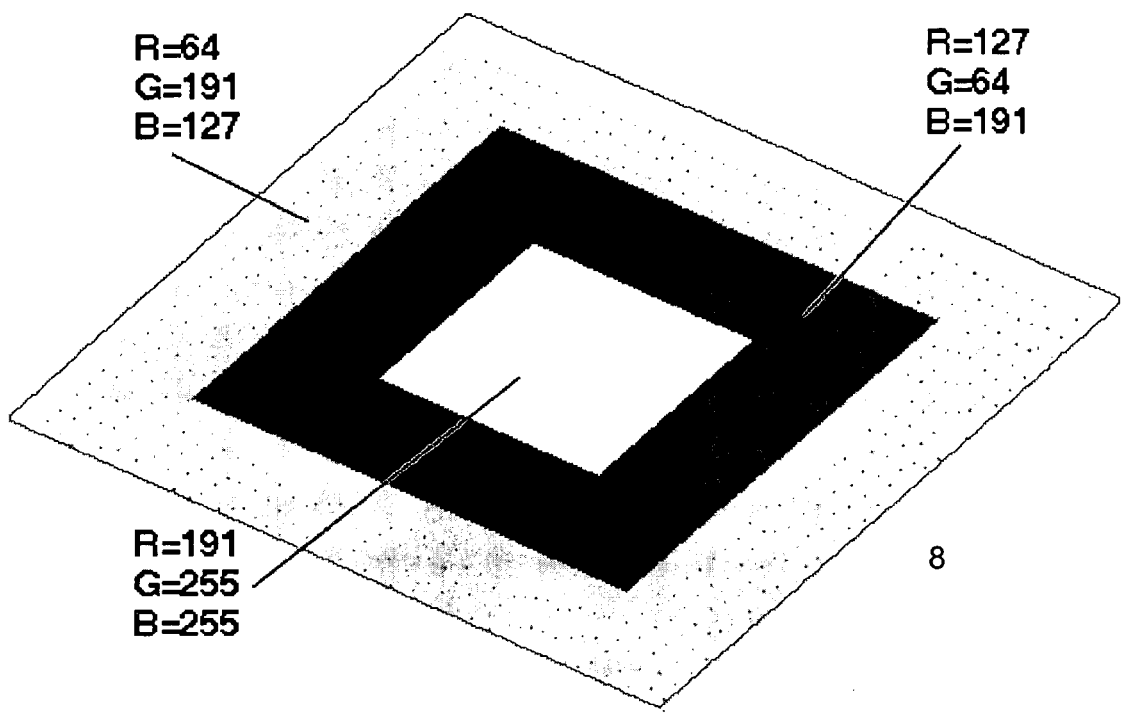
FIG. 9 illustrates artwork being mapped to microstructure pixels in accordance with an embodiment of the invention.
Figure 9:
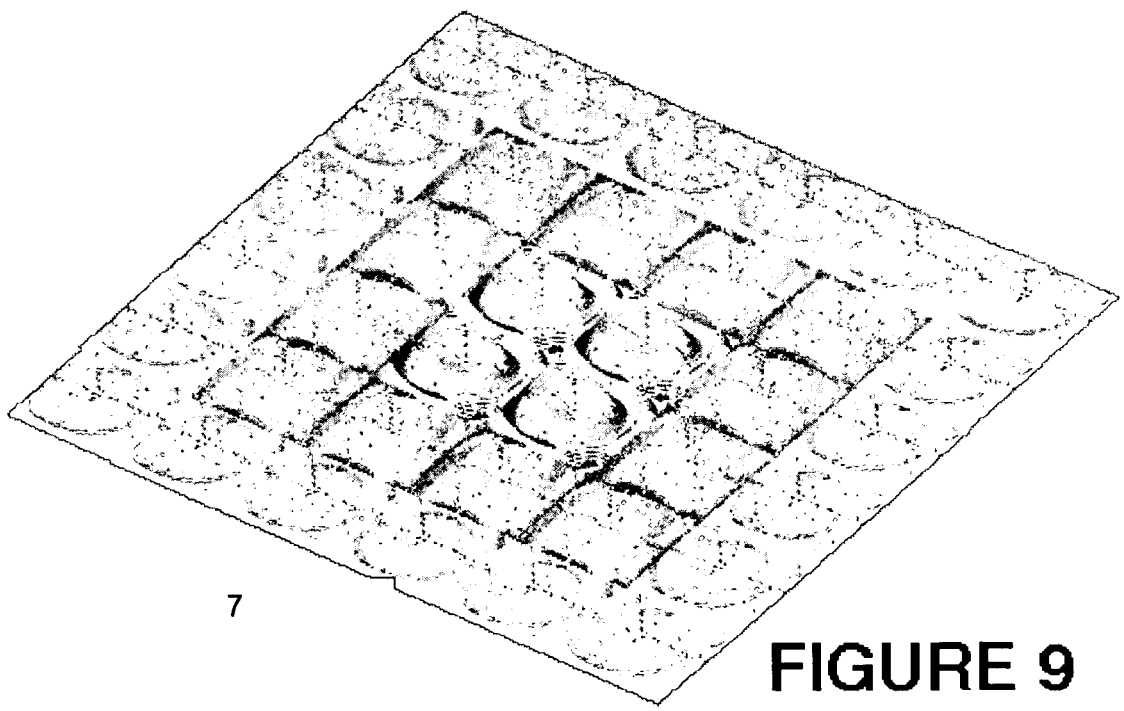

FIG. 9 shows the fundamental concept underpinning a key aspect of the invention. In FIG. 9 the same mathematical algorithm used in FIGS. 7 and 8 is used here to generate a small section of a surface microstructure 7 corresponding to a small section of input artwork 8. In this example the small section of input artwork 8 corresponds to a particular arrangement of 36 input artwork pixels corresponding to three elements of the RGB palette.

Figure 10:
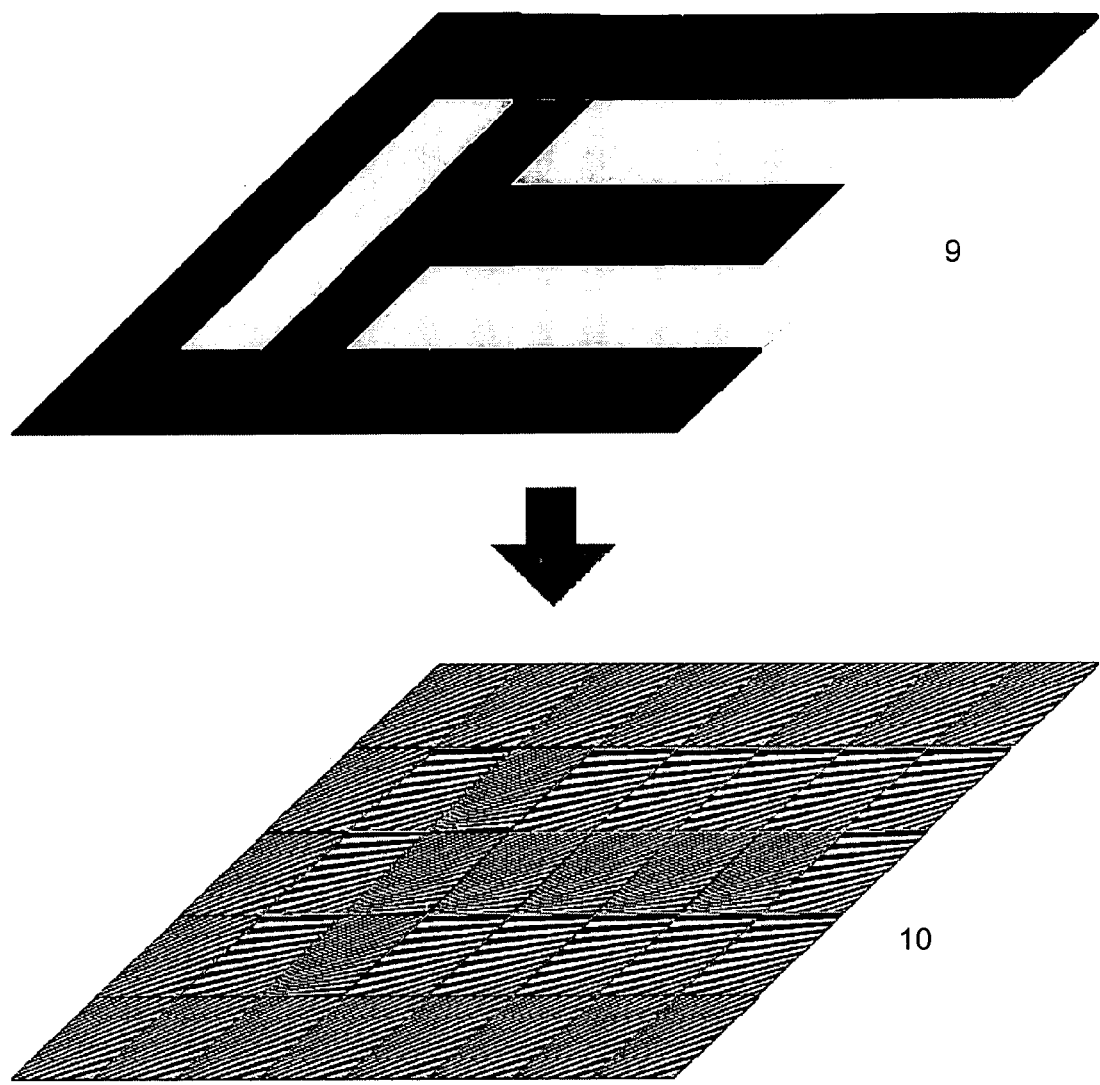
FIG. 10 illustrates artwork being mapped to diffractive microstructure pixels in accordance with another embodiment of the invention.

FIG. 10 shows a small section of a diffractive optical device according to the invention and corresponding to the mapping of a set of optically invariable pixels 9 onto a corresponding set of diffraction grating microstructure elements 10.

Figure 11:
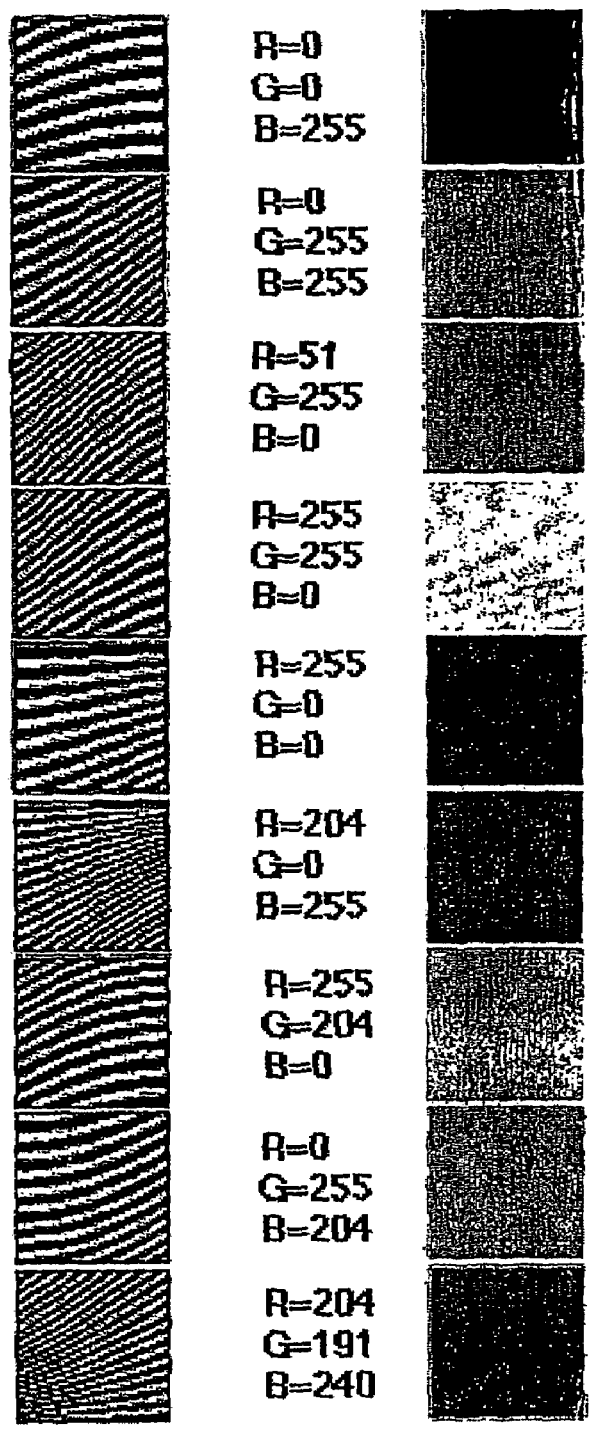
FIG. 11 shows the palette of diffractive pixels used in FIG. 10.

FIG. 11 shows an example of a diffraction grating palette and corresponding RGB values for the optical device shown in FIG. 10. In this case the micro-surface structure 10 represent a micro diffraction grating structure and the R, G and B values of each optically invariable pixel determine the micro diffraction grating average groove direction, spatial frequency and the curvature of the grooves within each of the corresponding micro diffraction grating structures.

Figure 12:
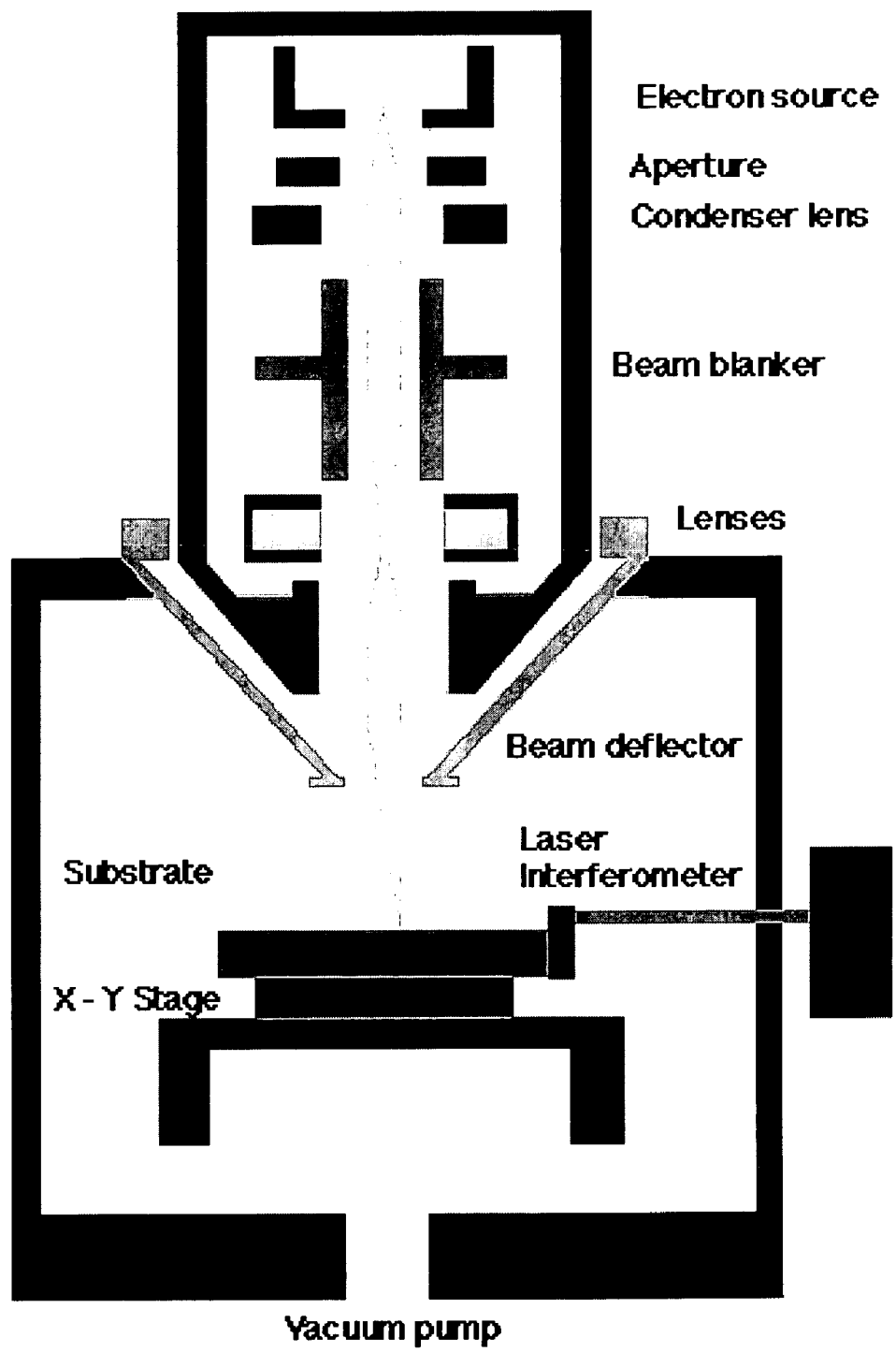
FIG. 12 shows an electron or ion beam exposure system for use in an embodiment of the invention.

FIG. 12 shows a schematic representation of an electron beam or ion beam exposure system whereby the distribution of electron or ion intensity on the resist substrate is determined by the distribution of red (R), green (G) and blue (B) colour values in the optically invariable image. This method of manufacturing an optical device according to the invention includes the steps of:

(a) forming a layer of electron or ion beam beam resist of thickness 100 microns or less on a conducting substrate, (b) exposing the resist layer to an accelerated electron or ion beam, said beam being of a gaussian or more general shape, in such a manner as to expose individual cellular or pixel regions of size 120 microns×120 microns or less on the resist in a sequential order so that the continuous variation of electron or ion beam intensity within each pixel region is continuously and functionally related via a mathematical or computer algorithm to the red (R), green (G) and blue (B) colour parameters of corresponding pixels within a counterpart optically invariable image that is stored in terms of an appropriate data format within the memory of a computer that is controlling, via appropriately programmed instructions, the exposure and scanning characteristics of said electron or ion beam, and (c) developing the resist layer, after exposure of all pixel regions is completed, to remove irradiated material in order to obtain a distribution of pixel surface relief profiles on the developed resist, wherein each pixel surface relief profile exactly matches the reflective or diffractive pixel surface properties required of each pixel region on the reflective or diffractive device.

Figure 13:
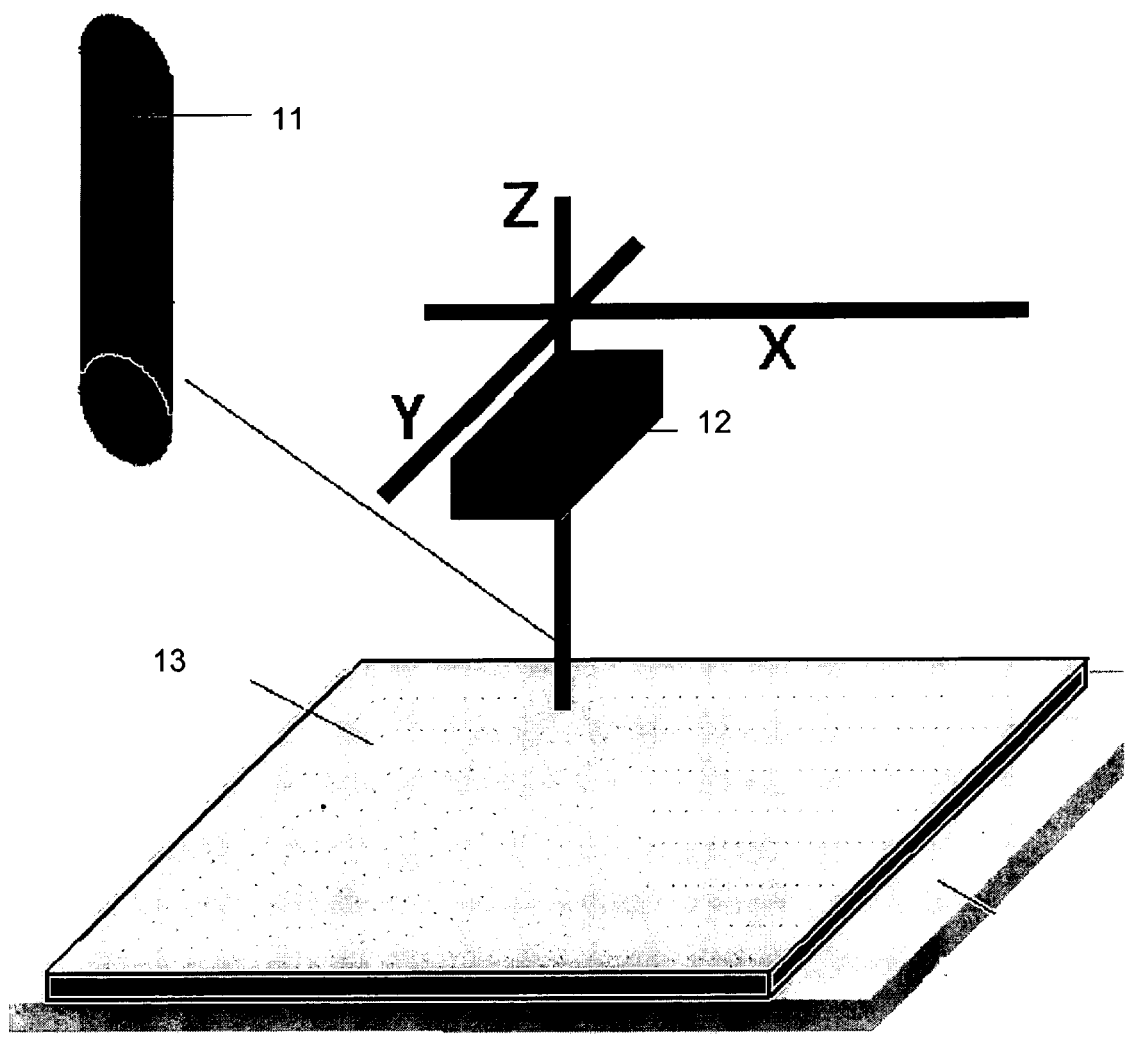
FIG. 13 shows a mechanical device for use in an embodiment of the invention.

FIG. 13 shows a mechanical device for producing an optical device according to the invention. The construction of this mechanical device includes the steps of:

(a) constructing a thin metal needle-like element 11 of diameter 500 microns or less wherein the tip of the needle 11 has been sliced at an angle to the needle direction to create a sloping mirror-like surface;

(b) inserting the needle-like device 11 into a mechanical holder attached to a mechanical arm that can move horizontally in both the x and y directions above a flat surface with the sloping surface of the needle 11 positioned towards the flat surface with the mechanical arrangement having the ability to move vertically downwards under pressure and the mechanical arrangement also having the ability to rotate the needle 11 about its own internal central axis at a predetermined angle of rotation;

(c) attaching a heating element 12 to the end of the needle 11 that is away from the flat surface and arranging for the heating element 12 to be able to generate a predetermined and controlled temperature at the other end of the needle 11;

(d) connecting the mechanical device to a control device driven by a computer to allow the needle 11 of the device to be heated to a predetermined temperature and moved to a sequence of (x,y) positions on the flat surface and then moved downwards under pressure so that the needle 11 is able to be inserted into the surface of a flat polycarbonate sheet 13 to a fixed depth and with a predetermined angle of rotation so that the angle of rotation of the needle 11 and its depth of penetration into the polycarbonate sheet 13 at a particular (x,y) position is a counterpart representation of the pixel RGB values at a corresponding (x,y) position within an optically invariable image stored in the memory of the computer.

It is to be understood that various alterations, additions and/or modifications may be made to the parts previously described without departing from the ambit of the invention.

The invention claimed is:

1. A method of manufacturing an optical device which generates an optically variable image, the image being optically variable in that it varies according to the position of observation, the method including the steps of:

dividing an optically invariable image into multiple pixels;

determining colour component values for each pixel;

for each of the pixels of the optically invariable image, determining an associated pixel surface structure which has a three-dimensional surface shape and curvature which is related via a mathematical or computer algorithm to the colour component values of the associated pixel in the optically invariable image, each pixel surface structure being an individual non-diffractive reflective surface structure which produces an observable optical effect; and producing an assembly of the non-diffractive reflective pixel surface structures which when illuminated generates a plurality of observable optical effects which combine to form an optically variable reproduction of the optically invariable image.

2. The method of claim 1 further comprising the steps of:

(a) forming a pixellated partially optically transparent mask by electron beam lithography and plasma etching techniques wherein each pixel of the mask is in one to ane correspondence with a corresponding pixel in the optically invariable image and the degree of optical transparency and wherein the distribution of transparency within each mask pixel is directly related via a mathematical or computer algorithm to the colour component values of the corresponding pixel within the optically invariable image;

(b) providing a substrate coated with a layer of optical resist material wherein the thickness of the resist is less than 100 microns;

(c) projecting light through the mask onto the substrate coated with said thick layer of optical resist and exposing the thick resist layer to a light intensity distribution corresponding to the pixel transparency distribution on the mask; and (d) developing the exposed thick resist layer removing the irradiated resist material from the exposed regions to obtain resist thickness variations corresponding with surface relief variations required of pixel surface structures on the optical device.

3. The method according to claim 2 wherein the pixel regions of the partially-transparent mask each consist of alternating opaque and transparent curved or straight lines of a finite thickness and wherein the distribution of opacity within each mask pixel region controls the light intensity distribution or X-ray intensity distribution on the resist layer in order to ensure that after development of the resist the shape of the remaining resist is in accordance with the reflective properties required of that region.

4. The method according to claim 2 wherein the pixel regions of the partially-transparent mask each consist of an array of transparent square, rectangular or circular apertures on an opaque background and wherein the distribution of opacity within each mask pixel region controls the light intensity distribution or X-ray intensity distribution on the thick resist layer in order to ensure that after development of the resist the shape of the remaining resist is in accordance with the reflective properties required of that region.

5. The method of claim 1 wherein the optically invariable image is stored in the memory of a computer and wherein the method further comprises the steps of:
    (a) providing a metal needle of diameter 500 microns or less wherein the needle has a tip which has one surface onented at an oblique angle to the axis of the needle;
    (b) inserting the needle-into a mechanical holder attached to a mechanical arm that can move with at least two degrees of freedom (x,y) above a flat surface, with the tip of the needle projecting towards the flat surface, the mechanical arrangement moving the needle vertically downwards under pressure, the mechanical arrangement also rotating the needle about its own axis;
    (c) attaching a heating element to the end of the needle furthest from the tip, wherein the heating element generates a predetermined and controlled temperature at the tip of the needle;
    (d) connecting the mechanical device to a control device driven by the computer which moves the needle to a sequence of (x,y) positions on the flat surface and at selected positions moves the needle downwards under pressure so that the needle is inserted into the surface of a reflecting material such as a polycarbonate sheet to a fixed depth and with a predetermined angle of rotation wherein the angle of rotation of the needle and its depth of penetration into the polycarbonate sheet at a particular (x,y) position is a counterpart representation of the pixel colour component values at a corresponding (x,y) position within the optically invariable image stored in the memory of the computer.

6. The method of claim 1 further comprising the steps of:
    (a) forming a layer of electron or ion beam resist of thickness 100 microns or less on a conducting substrate,
    (b) exposing the resist layer to an accelerated electron or ion beam, in such a manner as to expose individual pixel regions of size 120 microns×120 microns or less on the resist in a sequential order, wherein the electron or ion beam intensity is continuously varied and the degree and characteristics of intensity variation are functionally related via the mathematical or computer algorithm to the colour component parameters of corresponding pixels within the counterpart optically invariable image that is stored in an appropriate data format within the memory of a computer that is controlling, via appropriately programmed instructions, the exposure and scanning characteristics of said electron or ion beam, and
    (c) developing the resist layer, after exposure of pixel regions is completed, to remove irradiated material and obtaining a distribution of pixel surface relief profiles on the developed resist, wherein each pixel surface relief profile exactly matches the reflective or diffractive pixel surface properties required of each pixel region on the optical device.

7. The method of claim 1 further comprising the steps of:
    (a) forming a pixellated partially-X-ray-transparent mask by electron beam lithography techniques wherein each pixel of the mask is in one to one correspondence with a corresponding pixel in the optically invariable image, and the degree of X-ray transparency and the distribution of X-ray transparency within each mask pixel is directly minted via a mathematical or computer algorithm to the colour component values of the corresponding pixel within the optically invariable image;
    (b) providing a substrate coated with a layer of X-ray resist material;
    (c) projecting an X-ray beam through the mask onto the substrate coated with the layer of X-ray resist and exposing the resist layer to an X-ray intensity distribution corresponding to the pixel X-ray transparency distribution on the mask; and
    (d) developing the exposed resist layer to remove irradiated resist material from the exposed regions and obtaining resist thickness variations corresponding with surface relief variations required of pixel surface structures on the optical device.

8. The method according to claim 1 wherein the pixel surface structures are squares or circles less than 1 mm×1 mm in area and the maximum depth or height of each reflective pixel region is greater than 0.1 microns.

9. The method according to claim 1 further comprising selecting colour component values of each of the pixels of the optically invariable image from a scale containing a pre-determined finite number of colour component values.

10. The method according to claim 1 wherein said optical device is a durable metal master surface relief structure produced by electroplating an optical resist structure or an embossed polycarbonate structure.

11. A method according to claim 1 wherein the assembly of non-diffractive reflective pixel surface structures further includes a plurality of diffractive pixel surface structures.

12. An optical device providing in optically variable image, corresponding to an optically invariable counterpart image, the optical device including a pixellated reflective structure which is an assembly of non-diffractive reflective surface relief pixels, wherein the optical device when illuminated generates the optically variable image, the image being optically variable in that it varies according to the position of observation, wherein each of the non-diffractive reflective surface relief pixels is an individual reflecting surface structure, and wherein the optically variability is produced by differing angular orientations of the individual non-diffractive reflective surface relief pixels.

13. The optical device according to claim 12 which when illuminated generates two or more images Which are observable from different ranges of viewing angles around the device, wherein a first group of non-diffractive reflective surface relief pixels contributes to the generation of a first image, and a second group of non-diffractive reflective surface relief pixels contributes to the generation of a second image.

14. The optical device according to claim 12 further comprising a pixellated reflective structure which is an assembly of non-diffractive reflective surface relief pixels and which when illuminated generates an optically variable image, the image being optically variable in that it varies when viewed from different observation positions, wherein each of the non-diffractive reflective pixels is an individual non-diffractive reflecting three-dimensional surface structure which is directly related via a mathematical or computer algorithm to the colour component values of associated pixels of the optically invariable counterpart image.

15. The optical device according to claims 12 or 14 wherein the non-diffractive reflective pixels are each square or circular in shape with an area less than 1 mm square and each having a maximum depth greater than 0.1 microns.

16. The optical device according to claim 14 wherein an optically variable image observable after illumination of the device varies from a positive tone image to the corresponding reverse negative image as the angle of observation is changed.

17. The optical device according to claim 14 wherein the observed images generated by the device upon illumination appear to contain one or more artistic patterns, line drawings, lettering, facial or portrait images or geometric patterns.

18. A method of using the optical device according to claim 14, the method comprising observing a first image when the device is viewed from a first viewing direction wherein the first image switches to a second image when the viewing angle moves from the first direction to a second direction.

19. A method of using the optical device according to claim 14 as a printing device, the method comprising transferring ink or lacquer onto a paper or plastic substrate Wherein the reflective or diffractive properties of the die onto the ink or lacquer layer transferred to the paper or plastic substrate are replicated.

20. The method of claim 19, further comprising covering the surface structure of the printing device on the paper or polymer substrate by a thin clear or transparent lacquer or polymer layer in order to protect the surface of the device from being replicated by casting or electroplating techniques.

21. A method of protecting a product or document from counterfeiting or forgery, the method comprising replicating the reflective and/or diffractive structure of the optical device of claim 14 into a plastic film or metallised foil by embossing techniques and attaching the embossed film or fall adhesively to the surface of a commercial product or valuable document.

22. A method of using the optical device according to claim 12, the method comprising embossing its surface structure into a paper or plastic substrate wherein the reflective properties of the die are replicated on the paper or plastic substrate.

23. The method of claim 22 further comprising the step of transferring die surface structure of a stamping device or die to a paper, polymer or metal surface substrate by first stamping the paper, polymer or metal surface with a high pressure flat surface die to flatten the surface of the substrate before stamping the surface with the ink or lacquer coated microstructure.

24. The optical device according to claim 12 wherein the pixellated reflective structure of the device contains an array of micro-mirror elements of size 30 microns by 30 microns or less with each mirror region having a maximum depth of between 15 and 30 microns, the angles of inclination of the pixel mirror elements vary throughout the device to produce an optically variable image upon illumination of the device, and Wherein each pixel mirror angle is determined via a mathematical or computer algorithm by the colour component values of the corresponding pixel of the optically invariable counterpart image of said optically variable image.

25. An optical element in an imaging device operating in the infrared, visible, ultraviolet or X-ray wavelength regions of the electromagnetic spectrum comprising the optical device according to claim 12.

26. An optical device according to claim 12 further including a plurality of diffractive pixel surface structures.

* * * * *